US012776087B2

(12) United States Patent
Li et al.

(10) Patent No.: US 12,776,087 B2
(45) Date of Patent: Oct. 27, 2026

(54) METHOD FOR DYNAMIC 3D CROWD RECONSTRUCTION FROM A LARGE-SCENE VIDEO

(71) Applicant: Tianjin University, Tianjin (CN)

(72) Inventors: Kun Li, Tianjin (CN); Jian Ma, Tianjin (CN); Yuanwang Yang, Tianjin (CN); Hongbo Kang, Tianjin (CN); Jing Huang, Tianjin (CN); Hao Wen, Tianjin (CN); Yingdi Xie, Tianjin (CN)

( * ) Notice: Subject to any disclaimer, the term of this patent is extended or adjusted under 35 U.S.C. 154(b) by 144 days.

(21) Appl. No.: 18/900,758

(22) Filed: Sep. 29, 2024

(65) Prior Publication Data

US 2026/0073606 A1 Mar. 12, 2026

(30) Foreign Application Priority Data

Sep. 11, 2024 (CN) ......................... 202411275640.3

(51) Int. Cl.
*G06T 13/40* (2011.01)
*G06T 3/4007* (2024.01)
(Continued)

(52) U.S. Cl.
CPC ............ *G06T 13/40* (2013.01); *G06T 3/4007* (2013.01); *G06T 7/10* (2017.01); *G06T 7/251* (2017.01);
(Continued)

(58) Field of Classification Search
None
See application file for complete search history.

(56) References Cited

U.S. PATENT DOCUMENTS

2003/0001837 A1* 1/2003 Baumberg .............. G06T 15/20 345/419
2009/0219300 A1* 9/2009 Peleg ..................... G06V 20/40 345/630
(Continued)

OTHER PUBLICATIONS

Wen, Hao, Jing Huang, Huili Cui, Haozhe Lin, Yu-Kun Lai, Lu Fang, and Kun Li. "Crowd3D: Towards hundreds of people reconstruction from a single image." In Proceedings of the IEEE/CVF Conference on Computer Vision and Pattern Recognition, pp. 8937-8946. Jun. 17, 2023. (Year: 2023).*
(Continued)

*Primary Examiner* — Sultana M Zalalee

(57) ABSTRACT

This invention focuses on the 3D reconstruction of dynamic crowds in large-scene videos and introduces the DyCrowd framework, which reconstructs 3D position, pose, and shape of hundreds of people from a large-scene video. Our approach addresses frequent occlusions and modeling challenges in high-density crowds through a top-down strategy. This includes pre-reconstruction, matching individual movement sequences, and multi-stage iterative optimization. During the optimization process, we introduce a group optimization method with an asynchronous motion consistency loss. This method clusters individuals with similar trajectories, using high-quality and unoccluded movements within the group to guide the recovery of occluded individuals, thereby mitigating long-term occlusion issues. Furthermore, to address the lack of ground-truth human reconstruction labels in current large-scene datasets, we introduce a virtual benchmark dataset called VirtualCrowd for dynamic crowd reconstruction in large-scene videos.

7 Claims, 3 Drawing Sheets

(51) Int. Cl.

| | |
|---|---|
| ***G06T 7/10*** | (2017.01) |
| ***G06T 7/246*** | (2017.01) |
| ***G06T 7/73*** | (2017.01) |
| ***G06T 7/80*** | (2017.01) |
| ***G06T 17/00*** | (2006.01) |

(52) U.S. Cl.

CPC .................. *G06T 7/75* (2017.01); *G06T 7/80* (2017.01); *G06T 17/00* (2013.01); *G06T 2200/08* (2013.01); *G06T 2207/10016* (2013.01); *G06T 2207/20081* (2013.01); *G06T 2207/20132* (2013.01); *G06T 2207/30196* (2013.01); *G06T 2207/30241* (2013.01)

(56) References Cited

U.S. PATENT DOCUMENTS

| | | | | |
|---|---|---|---|---|
| 2017/0017857 | A1* | 1/2017 | Wolf | G06V 40/20 |
| 2020/0306640 | A1* | 10/2020 | Kolen | G06N 3/094 |
| 2021/0049779 | A1* | 2/2021 | Harviainen | G06T 19/20 |
| 2022/0084056 | A1* | 3/2022 | Zhou | G06V 10/762 |
| 2022/0108561 | A1* | 4/2022 | Groß | G06V 40/25 |
| 2023/0070514 | A1* | 3/2023 | Yuan | G06T 17/00 |
| 2023/0326043 | A1* | 10/2023 | Sun | G06T 7/246 |
| 2024/0211734 | A1* | 6/2024 | Rohwer | G06N 3/088 |

OTHER PUBLICATIONS

Ye, V., Pavlakos, G., Malik, J., & Kanazawa, A. (2023). Decoupling human and camera motion from videos in the wild. In Proceedings of the IEEE/CVF conference on computer vision and pattern recognition (pp. 21222-21232). (Year: 2023).*

Rajasegaran, Jathushan, Georgios Pavlakos, Angjoo Kanazawa, and Jitendra Malik. "Tracking people by predicting 3d appearance, location and pose." In Proceedings of the IEEE/CVF conference on computer vision and pattern recognition, pp. 2740-2749. 2022. (Year: 2022).*

Davis Rempe, Tolga Birdal, Aaron Hertzmann, Jimei Yang, Srinath Sridhar, and Leonidas J Guibas. HuMoR: 3D human motion model for robust pose estimation. In ICCV, 2021 (Year: 2021).*

Wang, Lei, and Piotr Koniusz. "Uncertainty-dtw for time series and sequences." European Conference on Computer Vision. Cham: Springer Nature Switzerland, 2022. (Year: 2022).*

* cited by examiner

METHOD FOR DYNAMIC 3D CROWD RECONSTRUCTION FROM A LARGE-SCENE VIDEO

CROSS-REFERENCE TO RELATED APPLICATION

This application claims priority of Chinese Patent Application No. 202411275640.3, filed on Sep. 11, 2024, the entire contents of which are incorporated herein by reference.

TECHNICAL FIELD

The invention belongs to the field of 3D vision technology and relates to the method for dynamic 3D crowd reconstruction method from a large-scene video.

BACKGROUND

In large-scene videos, the reconstruction of the 3D positions, poses, and shapes of dynamic crowds holds great significance in fields such as public safety, emergency management, and sports. By accurately reconstructing dynamic crowds, it is possible to monitor and analyze crowd behavior, enabling the identification of potential security threats and abnormal situations, or to perform accident reconstruction. Additionally, in sports events and large gatherings, this technology can provide precise analysis of player or audience behavior, aiding in the improvement of strategies and optimization of event arrangements.

Although various methods have been developed to reconstruct multiple people's poses and shapes from videos of small or medium scenes, they face difficulties in handling dynamic human reconstruction in large scenes due to variations in individual scales and differences in camera perspectives. Specifically, current methods first track the local positions of individuals in the image and then perform single-person dynamic reconstruction. However, these methods rely on weak perspective projection assumptions and discard key position information of individuals. Other approaches use end-to-end methods to estimate SMPL models but struggle in large scenes because scaling large-scene images to fit the network's input resolution results in the loss of most medium and small individuals. Advanced methods like Crowd3D (Wen H, Huang J, Cui H, et al. Crowd3D: Towards hundreds of people reconstruction from a single image[C]. Proceedings of the IEEE/CVF Conference on Computer Vision and Pattern Recognition. 2023:8937-8946.) and GroupRec (Huang B, Ju J, Li Z, et al. Reconstructing groups of people with hypergraph relational reasoning[C]. Proceedings of the IEEE/CVF International Conference on Computer Vision. 2023:14873-14883.) can reconstruct the 3D positions, poses, and shapes of hundreds of individuals within a unified camera coordinate system from a single large-scene image. However, when applied to each frame of a large-scene video, these methods often produce temporally unstable and unsmooth 3D motion, frequently losing objects due to heavy or complete occlusion.

In large-scene videos, the high density of moving individuals and frequent occlusion events create spatial and temporal discontinuities, severely affecting the accuracy of dynamic human reconstruction in large-scene environments.

To address these issues, this invention proposes the method for dynamic 3D crowd reconstruction from a large-scene video. The algorithm reconstructs the 3D positions, poses, and shapes of dynamic crowds from a large-scene video and solves the dynamic occlusion problem. It proposes a crowd grouping optimization paradigm to cluster individuals with similar motion trajectories and adaptively uses high-quality unoccluded sequences to repair low-quality sequences, addressing incomplete motion due to dynamic occlusion. An asynchronous motion consistency loss is designed, employing dynamic time warping algorithm to find the best alignment between pose sequences, and allowing high-quality aligned pose sequences to guide the reconstruction of occluded sequences. A variational autoencoder (VAE) is used to train a human motion prior model, significantly enhancing the realism and smoothness of the motion. Furthermore, a new synthetic dataset called VirtualCrowd has been created to validate and advance research in large-scene dynamic crowd reconstruction.

DESCRIPTION OF INVENTION

(I) Technical Problem to be Solved by this Invention

The purpose of this invention is to propose the method for dynamic 3D crowd reconstruction from a large-scene video to address the issues raised in the background technology. Specifically, existing methods are unable to achieve dynamic 3D crowd reconstruction from a large-scene video with coherence, realism, occlusion robustness and interaction harmony with the ground.

(II) to Achieve the Above Purpose, this Invention Adopts the Following Technical Solution The method for dynamic 3D crowd reconstruction from a large-scene video, characterized by the following steps:

S1: Segment each large-scene image into several image blocks using an adaptive cropping method and scale the image blocks to a uniform size, maintaining the original aspect ratio;

S2: Detect the bounding boxes, masks, and 2D keypoints of individuals in the image blocks obtained from S1. After merging and deduplication, acquire the bounding boxes, masks, and 2D keypoints of all individuals in the large-scene image. Based on these 2D keypoints, automatically select several walking and standing individuals as human priors to calibrate the camera parameters and estimate the ground plane equation;

S3: Based on the 2D information and camera parameters obtained in S2, estimate the initial parameter model SMPL for each individual in the large-scene video and 3D Human-scene Virtual Interaction Point (3DHVIP). Then, obtain the motion trajectory of each individual using a matching and tracking method that combines detection and prediction. Meanwhile, the SMPL model is initially optimized by 2D keypoints of each individual;

S4: Based on the preliminary optimization results of S3, use a pose prior optimizer to perform position and pose optimization for the SMPL model in each frame;

S5: Train a human motion prior model using a variational autoencoder, considering posture variations during motion, and further optimize the SMPL model in each frame;

S6: Design a crowd grouping optimization paradigm. Divide the crowd in the large-scene video into several groups based on their trajectories, introduce an asynchronous motion consistency loss, and use unoccluded sequences to guide occluded sequences, ultimately obtaining the dynamic reconstruction of the crowd.

Preferably, the specific implementation process of S1 is as follows:

S101: Based on the observation that people appear larger when closer to the camera and smaller when farther from the camera in a large-scene video, set the sizes of the image blocks proportionally according to the sizes of individuals in the vertical direction;

S102: The low-resolution image is unified to the resolution of by bilinear interpolation method.

Preferably, the specific implementation process of the estimation of the camera parameters and the ground equation in S2 is as follows:

$$\underset{K,N,D}{\operatorname{argmin}}\left|\lambda_{angle}L_{cos}(p_s'-p_a,\,p_s-p_a)+\lambda_{mod}\frac{\left|\|p_s'-p_a\|_2-\|p_s-p_a\|_2\right|}{\|p_s-p_a\|_2}\right|$$

$$z_s'\times p_s'=K\left(z_a\times K^{-1}p_a+h\times N\right),$$

where K is the camera parameter matrix, N is the ground normal, D is the constant term of the ground equation, and $L_{cos}$ is the cosine distance; $\lambda_{angle}$ and $\lambda_{mod}$ are the weights of the corresponding loss items; $p_s$ and $p_a$ are the center of the shoulders and the center of the ankles; p's is the predicted shoulder center point estimated by using the camera parameters and the ground equation; $\|\cdot\|_2$ is the second norm; $z_a$ is the depth of the center point of the ankle; z's is the depth of the center of the shoulder; h is the height of the person.

Preferably, the specific implementation process of S3 is as follows:

S301: Estimate the initial parameter model (SMPL model) and 3D Human-scene Virtual Interaction Point (3DHVIP) in the local coordinate system based on the image blocks and bounding boxes, 2D keypoints of all individuals;

S302: Extract features of poses (SMPL model), position (2D keypoints, 3DHVIP), and appearance (Mask) for each individual, forming frame-wise representation. Based on previous frames representation, predict the current-frame representation of individuals and match this representation with the detections of other individuals in the current frame to update the trajectory, thereby achieving continuous tracking of individuals;

S303: Use the human motion trajectory information and the detected 2D keypoints to preliminarily optimize poses of the SMPL model.

Preferably, the specific implementation process of S4 is as follows:

S401: Use a pose prior optimizer for root optimization, adjusting the rotation and translation matrices of the root node in the preliminarily optimized SMPL model;

S402: Use the pose prior optimizer again for SMPL optimization to adjust the root node's rotation matrix, translation matrix, pose, and shape.

Preferably, S5 introduces a human motion prior model is trained through a variational autoencoder using an encoder-decoder structure. During optimization, latent variable encoding is extracted from the motion and used as an optimization variable, which is subsequently decoded to obtain the optimized SMPL model.

Preferably, the specific implementation process of S6 is as follows:

S601: Design a new crowd grouping paradigm by dividing the crowd's motion sequences in the global space into several segments. Then, cluster these motion sequences and divide the crowd in the large-scene video into smaller groups with similar motion patterns;

S602: Calculate the unocclusion score of each individual's motion based on the 2D keypoint detection confidence and joint importance. Adaptively select the occluded sequence to be repaired and the corresponding unoccluded sequence, along with the optimization weights for the unoccluded sequence;

S603: Introduce an asynchronous motion consistency loss for joint optimization, guiding the reconstruction of occluded sequences through unoccluded sequences:

$$E_{AMC}=\frac{1}{N_{updated}}\sum_{g\in G}\sum_{i\in S_g}w_i\cdot\text{Soft}-DTW(x_i,r_g),$$

where G is the set of all groups. $S_g$ is the set of people (indices) in group g. $w_i$ is the weight for person i in group g. $x_i$ is the sequence of body poses for person i. $r_g$ is the reference sequence for group g: If there is a "best" person identified in the group (with index b), $r_g=x_b$. If no best person is identified, $r_g$ is a fixed template sequence. Soft-DTW($x_i$, $r_g$) is the soft dynamic time warping loss between sequences $x_i$ and $r_g$. $N_{updated}$ is the total number of people across all groups with a weight $w_i>0$ (i.e., the number of people being updated).

(III) the Beneficial Effects of the Present Invention Include the Following Points (1) This invention presents a novel framework for reconstructing the 3D positions, poses, and shapes of hundreds of people from a large-scene video, yielding several noteworthy beneficial effects. By leveraging monocular video inputs, it achieves coherent and realistic reconstruction that are robust to occlusions and seamlessly interact with the ground plane.

(2) A key beneficial effect lies in the employment of a crowd grouping optimization paradigm. This approach clusters individuals with similar motion trajectories, enabling the adaptive utilization of high-quality unoccluded sequences to repair low-quality, occluded ones. This effectively addresses the issue of motion loss due to dynamic occlusions, resulting in more complete and accurate reconstruction.

(3) The introduction of an asynchronous motion consistency loss constitutes another significant benefit. This loss function leverages temporal alignment techniques to find the optimal alignment between pose sequences, allowing occluded sequences to be guided by the corresponding, aligned high-quality pose sequences. This enhances the temporal coherence and accuracy of the reconstruction, particularly in scenarios with complex occlusions.

(4) The invention contributes to the realism and smoothness of the motion by incorporating a human motion prior model, trained using a variational autoencoder. This model captures the inherent characteristics of human motion, further refining the reconstructed crowd behaviors to be more natural and lifelike.

In summary, the beneficial effects of this invention are multifold, including improved robustness to occlusions, enhanced temporal coherence, and increased realism and smoothness of the reconstructed crowd motions. These effects collectively contribute to the production of high-quality, coherent, and realistic 3D reconstruction of hundreds of people from a large-scene video.

MODE OF CARRYING OUT THE INVENTION

The technical solutions in the embodiments of the present invention will be clearly and completely described below with reference to the drawings in the embodiments of the present invention. Obviously, the described embodiments are only a part of the embodiments of the present invention, not all of the embodiments. Based on the embodiments in the present invention, all other embodiments obtained by a person of ordinary skill in the art without making creative efforts shall fall within the protection scope of the present invention.

Embodiment 1

Figure 1:
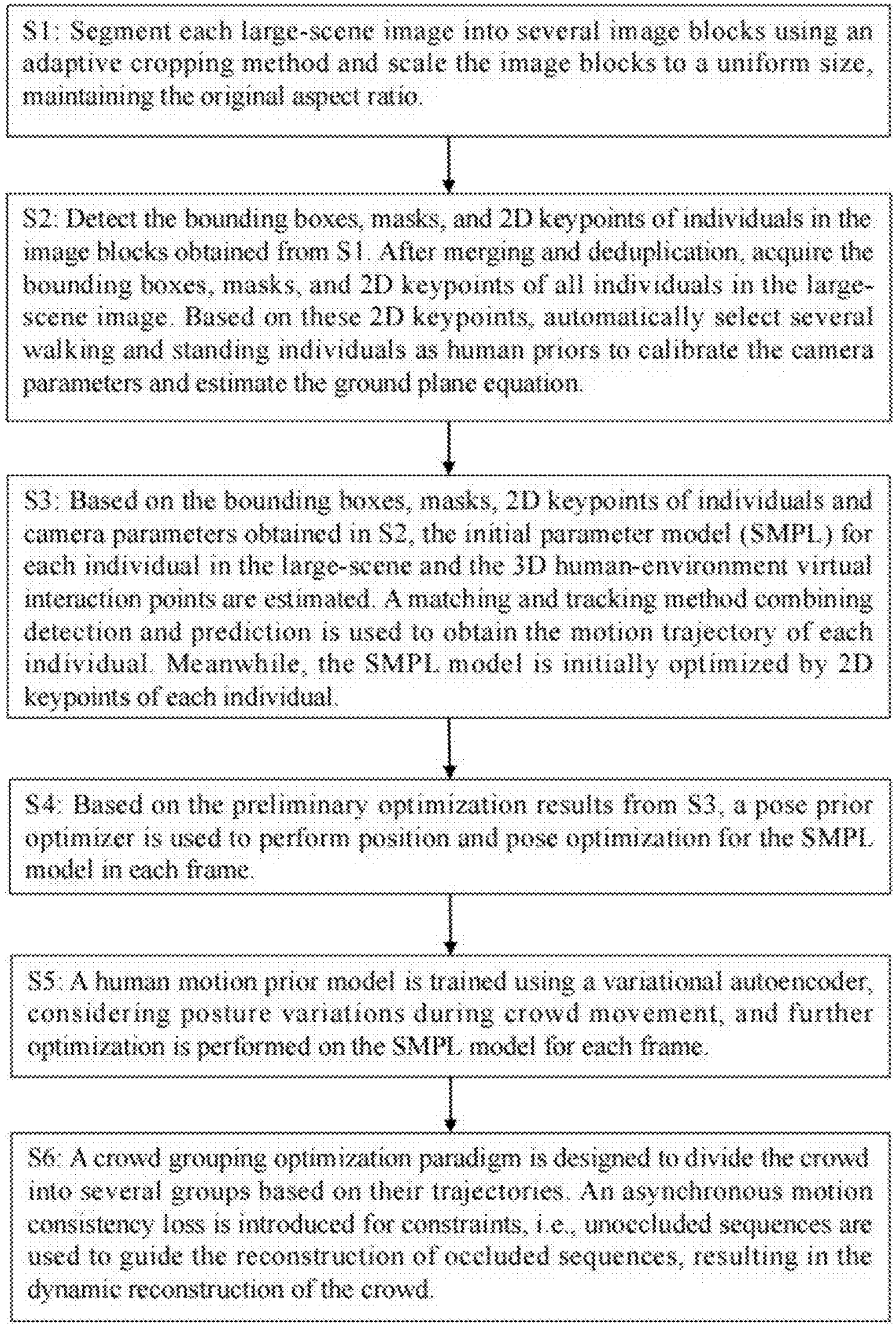
FIG. 1 is a framework diagram for the method for dynamic 3D crowd reconstruction from a large-scene video proposed in this invention.
Figure 2:
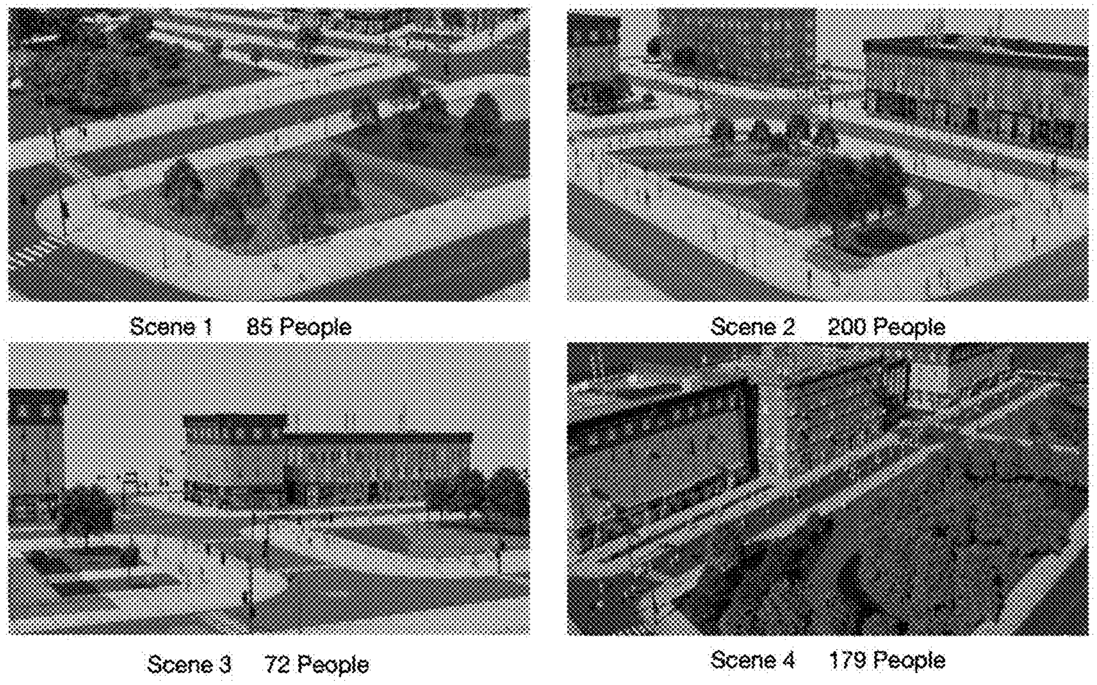
FIG. 2 shows some rendered images of VirtualCrowd dataset proposed in this invention.

Please refer to FIG. 1. This invention proposes the method for dynamic 3D crowd reconstruction from a large-scene video, which includes the following steps:

S1: Segment each large-scene image into several image blocks using an adaptive cropping method and scale the image blocks to a uniform size, maintaining the original aspect ratio. The specific steps are as follows:

S101: Based on the observation that people appear larger when closer to the camera and smaller when farther from the camera in a large-scene video, set the sizes of the image blocks proportionally according to the sizes of individuals in the vertical direction;

S102: The low-resolution image is unified to the resolution of (512, 512) by bilinear interpolation method.

S2: Detect the bounding boxes, masks, and 2D keypoints of individuals in the image blocks obtained from S1. After merging and deduplication, acquire the bounding boxes, masks, and 2D keypoints of all individuals in the large-scene image. Based on these 2D keypoints, automatically select several walking and standing individuals as human priors to calibrate the camera parameters and estimate the ground plane equation. The method for estimating the camera parameters and ground plane equation is as follows:

$$\underset{K,N,D}{\operatorname{argmin}}\left|\lambda_{angle}L_{cos}(p_s'-p_a,\ p_s-p_a)+\lambda_{mod}\frac{\left|\|p_s'-p_a\|_2-\|p_s-p_a\|_2\right|}{\|p_s-p_a\|_2}\right|$$

$$z_s'\times p_s'=K\left(z_a\times K^{-1}p_a+h\times N\right),$$

where K is the camera parameter matrix; N is the ground normal; D is the constant term of the ground equation; $L_{cos}$ is the cosine distance; $\lambda_{angle}$ and $\lambda_{mod}$ are the weights of the corresponding loss items; $p_s$ and $p_a$ are the center of the shoulders and the center of the ankles; p's is the predicted shoulder center point estimated by using the camera parameters and the ground equation; $\|\bullet\|_2$ is the second norm; $z_a$ is the depth of the center point of the ankle; z's is the depth of the center of the shoulder; h is the height of the person, which is set to 1.7 meters.

S3: Based on the 2D information and camera parameters obtained in S2, estimate the initial parameter model SMPL for each individual in the large-scene video and 3D Human-scene Virtual Interaction Point (3DHVIP). Then, obtain the motion trajectory of each individual using a matching and tracking method that combines detection and prediction. Meanwhile, the SMPL model is initially optimized by 2D keypoints of each individual. The specific process is as follows:

S301: Estimate the initial parameter model (SMPL model) and 3D Human-scene Virtual Interaction Point (3DHVIP) in the local coordinate system based on the image blocks and bounding boxes, 2D keypoints of all individuals;

S302: Extract features of poses (SMPL model), position (2D keypoints, 3DHVIP), and appearance (Mask) for each individual, forming frame-wise representation. Based on previous frames representation, predict the current-frame representation of individuals and match this representation with the detections of other individuals in the current frame to update the trajectory, thereby achieving continuous tracking of individuals;

S303: Use the human motion trajectory information and the detected 2D keypoints to preliminarily optimize poses of the SMPL model.

S4: Based on the preliminary optimization results of S3, use a pose prior optimizer to perform position and pose optimization for the SMPL model in each frame. The specific process is as follows:

S401: Use a pose prior optimizer for root optimization, adjusting the rotation and translation matrices of the root node in the preliminarily optimized SMPL model;

S402: Use the pose prior optimizer again for SMPL optimization to adjust the root node's rotation matrix, translation matrix, pose, and shape.

S5 introduces a human motion prior model trained through a variational autoencoder using an encoder-decoder structure. During optimization, latent variable encoding is extracted from the motion and used as an optimization variable, which is subsequently decoded to obtain the optimized SMPL model.

S6: Design a crowd grouping optimization paradigm. Divide the crowd in the large-scene video into several groups based on their trajectories, introduce an asynchronous motion consistency loss, and use unoccluded sequences to guide occluded sequences, ultimately obtaining the dynamic reconstruction of the crowd. The specific process is as follows:

S601: Design a new crowd grouping paradigm by dividing the crowd's motion sequences in the global space into several segments. Then, cluster these motion sequences and divide the crowd in the large-scene video into smaller groups with similar motion patterns;

S602: Calculate the unocclusion score of each individual's motion based on the 2D keypoint detection confidence and joint importance. Adaptively select the occluded sequence to be repaired and the corresponding unoccluded sequence, along with the optimization weights for the unoccluded sequence;

S603: Introduce an asynchronous motion consistency loss for joint optimization, guiding the reconstruction of occluded sequences through unoccluded sequences:

$$E_{AMC} = \frac{1}{N_{updated}} \sum_{g \in G} \sum_{i \in S_g} w_i \cdot \text{Soft} - DTW(x_i, r_g),$$

where G is the set of all groups. $S_g$ is the set of people (indices) in group g. $w_i$ is the weight for person i in group g. $x_i$ is the sequence of body poses for person i. $r_g$ is the reference sequence for group g: If there is a "best" person identified in the group (with index b), $r_g = x_b$. If no best person is identified, $r_g$ is a fixed template sequence. Soft-DTW($x_i$, $r_g$) is the soft dynamic time warping loss between sequences $x_i$ and $r_g$. $N_{updated}$ is the total number of people across all groups with a weight $w_i > 0$ (i.e., the number of people being updated).

Embodiment 2

Please refer to FIGS. 1-4. Based on Embodiment 1, the differences are as follows: This invention proposes a method for dynamic 3D crowd reconstruction from a large-scene video. The specific implementation process is as follows:

(I) Data Preprocessing:

First, a large-scene image is adaptively cropped and divided into blocks centered on individuals, and the resolution is standardized to 512×512. For an image block, the VitDet (Li Y, Mao H, Girshick R, et al. Exploring plain vision transformer backbones for object detection[C]. European conference on computer vision. Cham: Springer Nature Switzerland, 2022:280-296.) 2D detection method is applied to obtain the bounding boxes and mask sequences of all visible subjects. Based on each bounding boxes, the state-of-the-art DWPose (Yang Z, Zeng A, Yuan C, et al. Effective whole-body pose estimation with two-stages distillation[C]. Proceedings of the IEEE/CVF International Conference on Computer Vision. 2023:4210-4220.) is used to estimate the initial 2D keypoints, with an initial filtering step to discard unrealistic poses, resulting in accurate 2D keypoints along with their corresponding bounding boxes and masks. A subset of individuals, particularly those standing or walking, is selected as prior information for human posture, which is used to calibrate the ground plane equation and scene-level camera parameters.

(II) Tracking and Crowd Initialization Process:

This embodiment introduces a 3D virtual position representation-3D human-environment virtual interaction points, which are the projection points of the person's center of mass onto the ground. These points provide more stable 3D position information and significantly improve matching accuracy. To avoid the substantial computational cost associated with global matching, the proposed method is based on a more stable position representation and only matches spatially adjacent individuals, which significantly enhances efficiency and practicality.

(III) Crowd Grouping Optimization Paradigm:

A crowd grouping optimization paradigm is designed to leverage collective intra-group motion, allowing high-quality, unoccluded motion sequences to aid in recovering the motion of occluded individuals. First, all individuals' motion sequences are divided into segments of 64 frames, and individuals with similar motion trajectories are clustered. The unocclusion score for each individual's motion is calculated based on detection confidence and joint importance, and sequences requiring repair are identified adaptively. High-quality unoccluded sequences and their corresponding optimization weights are also identified. For sequences needing repair, the algorithm first prioritizes optimizing using the individual's own high-quality unoccluded segments, followed by using high-quality sequences from individuals within the same group with similar motion trajectories. If neither is available, a pre-defined template is used as a guide. An asynchronous motion consistency loss is then introduced, utilizing temporal alignment to find the best alignment between pose sequences, thereby enabling occluded sequences to be guided by aligned high-quality pose sequences.

(IV) VirtualCrowd Dataset:

To create this dataset, the ICity plugin (ICity, https://icity3d.com, 2024.) plugin is used to create the scene, from which the ground is obtained, and human motion trajectories are generated based on the ground. Motion sequences are generated using DIMOS (Zhao K, Zhang Y, Wang S, et al. Synthesizing diverse human motions in 3d indoor scenes[C]. Proceedings of the IEEE/CVF International Conference on Computer Vision. 2023:14738-14749.), and the large-scene crowd motion video dataset is synthesized through rendering with Blender (Blender Foundation. Blender (Version 4.2 LTS). https://www.blender.org, 2024.). The dataset contains four scenes, each featuring video sequences of hundreds of people in motion, with an average of 200 frames per video; specific results can be seen in FIG. 2.

Figure 3:
FIG. 3 is a display diagram of the reconstruction in a real-world scene of the method for dynamic 3D crowd reconstruction from a large-scene video proposed in this invention. The diagram shows a pixel-aligned reconstruction in the camera coordinate system, along with reconstruction results under a camera view and a bird's-eye view in the world coordinate system.
Figure 4:
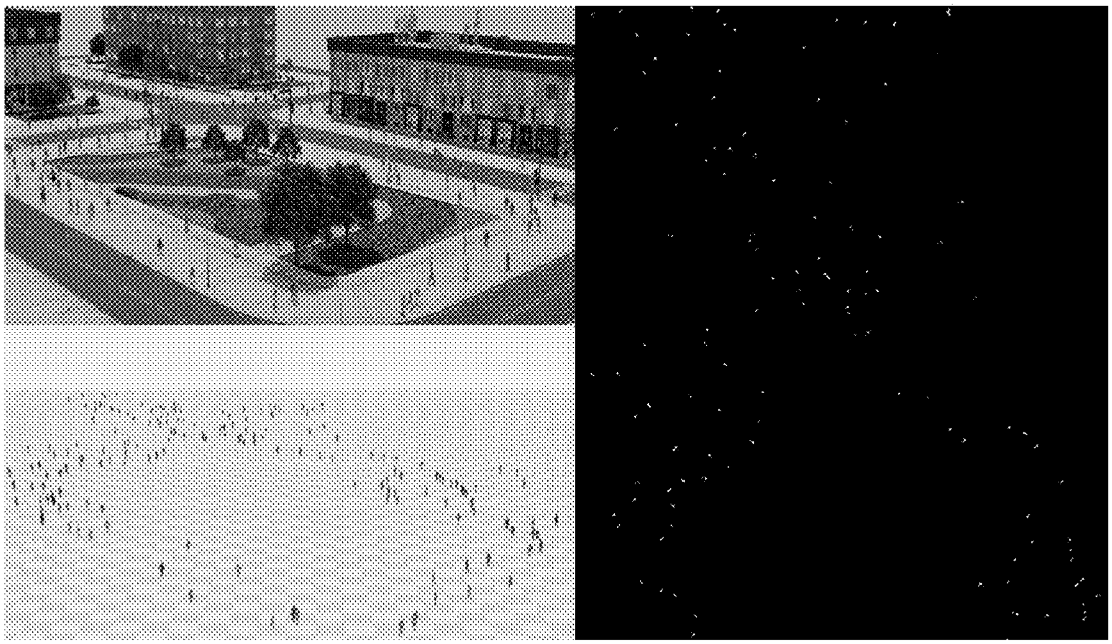
FIG. 4 is a display diagram of the reconstruction in a virtual scene of the method for dynamic 3D crowd reconstruction from a large-scene video proposed in this invention. The diagram shows a pixel-aligned reconstruction in the camera coordinate system, along with reconstruction results under a camera view and a bird's-eye view in the world coordinate system.

FIG. 3 demonstrates a pixel-aligned reconstruction in the camera coordinate system, along with both a camera view and a bird's-eye view presented in the world coordinate system. The results indicate that the reconstructed poses not only accurately match the input viewpoints and motion trajectories but also maintain the correct relative positions between individuals in the world coordinate system. FIG. 4, on the other hand, presents the reconstruction results in a virtual scene, including a pixel-aligned reconstruction in the camera coordinate system, along with reconstruction results under a camera view and a bird's-eye view in the world coordinate system. Despite occlusions in the virtual environment, the reconstructed motion trajectories remain highly smooth and coherent, with the entire motion sequence displaying a high degree of realism and fluidity.

A comparison of the reconstruction method from Embodiment 1 with the mainstream large-scene 3D reconstruction methods, Crowd3D (Wen H, Huang J, Cui H, et al. Crowd3D: Towards hundreds of people reconstruction from a single image[C]. Proceedings of the IEEE/CVF Conference on Computer Vision and Pattern Recognition. 2023:8937-8946.) and GroupRec (Huang B, Ju J, Li Z, et al. Reconstructing groups of people with hypergraph relational reasoning[C]. Proceedings of the IEEE/CVF International Conference on Computer Vision. 2023:14873-14883.), on VirtualCrowd dataset has been conducted. The specific quantitative comparison results are presented in Table 1.

TABLE 1

| Methods | PPDS | PA-PPDS | PCOD | MPJPE | PA-MPJPE | WA-MPJPE | W-MPJPE | ACCEL |
|---|---|---|---|---|---|---|---|---|
| Crowd3D | 85.27 | 90.85 | 92.98 | 124.02 | 72.11 | — | — | — |
| GroupRec | 74.76 | 75.97 | 87.28 | 95.14 | 55.74 | 63.58 | 76.12 | 124.09 |
| This Invention | 84.58 | 92.24 | 94.35 | 63.57 | 41.70 | 48.28 | 63.83 | 13.41 |

As shown in the Table 1, there are eight evaluation metrics for the quantitative results: PPDS, PA-PPDS, PCOD, MPJPE, PA-MPJPE, WA-MPJPE, W-MPJPE, and ACCEL. For the first three metrics, higher values indicate better performance, while for the last five, lower values are preferred. PPDS (Pairwise Percentage Distance Similarity) measures the relative position of individuals; PA-PPDS is the Procrustes-aligned version of PPDS, eliminating the effects of scale and rotation; PCOD (Percentage of Correct Ordinal Depth) measures the ordinal depth relationship between all pairs of people in the image; MPJPE (Mean Per Joint Position Error) evaluates the accuracy of joint reconstruction; PA-MPJPE is the Procrustes-aligned version of MPJPE; WA-MPJPE measures MPJPE after aligning the motion sequences based on trajectories; W-MPJPE measures MPJPE after aligning the first frame of the motion sequence; and ACCEL measures joint acceleration, assessing the smoothness of motion.

It can be seen that while the reconstruction of this invention is slightly lower than Crowd3D (Wen H, Huang J, Cui H, et al. Crowd3D: Towards hundreds of people reconstruction from a single image[C]. Proceedings of the IEEE/CVF Conference on Computer Vision and Pattern Recognition. 2023:8937-8946.) in terms of PPDS, they significantly outperform other methods in all other metrics. Therefore, the reconstruction of this invention achieves the best performance on VirtualCrowd dataset.

The above description is only a better specific embodiment of this invention, but the protection scope of this invention is not limited to this. Any technical personnel familiar with this technical field can make equivalent replacements or changes to the technical solution of this invention within the disclosed technical scope of this invention according to the improvement ideas of this invention, which should all be covered by the protection scope of this invention.

The invention claimed is:

1. A method for dynamic 3D crowd reconstruction from a large-scene video, characterized by the following steps:

S1: Segment each large-scene image into several image blocks using an adaptive cropping method and scale the image blocks to a uniform size, maintaining the original aspect ratio;

S2: Detect the bounding boxes, masks, and 2D keypoints of individuals in the image blocks obtained from S1; after merging and deduplication, acquire the bounding boxes, masks, and 2D keypoints of all individuals in the large-scene image; based on these 2D keypoints, automatically select several walking and standing individuals as human priors to calibrate the camera parameters and estimate the ground plane equation;

S3: Based on the 2D information and camera parameters obtained in S2, estimate the initial parameter model SMPL for each individual in the large-scene video and 3D Human-scene Virtual Interaction Point (3DHVIP); then, obtain the motion trajectory of each individual using a matching and tracking method that combines detection and prediction; meanwhile, the SMPL model is initially optimized by 2D keypoints of each individual;

S4: Based on the preliminary optimization results of S3, use a pose prior optimizer to perform position and pose optimization for the SMPL model in each frame;

S5: Train a human motion prior model using a variational autoencoder, considering posture variations during motion, and further optimize the SMPL model in each frame;

S6: Design a crowd grouping optimization paradigm; divide the crowd in the large-scene video into several groups based on their trajectories, introduce an asynchronous motion consistency loss, and use unoccluded sequences to guide occluded sequences, wherein:

motion sequences are grouped based on trajectory similarity;

an unocclusion score is computed based on 2D keypoint detection confidence and joint importance;

sequences with higher unocclusion scores are adaptively selected as unoccluded sequences for guiding optimization; and the selected unoccluded sequences are used to guide optimization of occluded sequences within the same group, thereby ultimately obtaining the dynamic reconstruction of the crowd, wherein the guidance is performed by using the selected reference sequences to influence optimization of occluded sequences within the same group under asynchronous temporal alignment.

2. The method for dynamic 3D crowd reconstruction from a large-scene video according to claim 1, characterized in that the specific implementation process of S1 is as follows:

S101: Based on the observation that people appear larger when closer to the camera and smaller when farther from the camera in a large-scene video, set the sizes of the image blocks proportionally according to the sizes of individuals in the vertical direction;

S102: The low-resolution image is scaled to a uniform resolution of (n,n) by bilinear interpolation method.

3. The method for dynamic 3D crowd reconstruction from a large-scene video according to claim 2, characterized in that the estimation of the camera parameters and the ground equation in S2 is as follows:

$$\underset{K,N,D}{\operatorname{argmin}}\left|\lambda_{angle}L_{cos}(p'_s-p_a,\ p_s-p_a)+\lambda_{mod}\frac{\left|\|p'_s-p_a\|_2-\|p_s-p_a\|_2\right|}{\|p_s-p_a\|_2}\right|$$

$$z'_s\times p'_s=K\left(z_a\times K^{-1}p_a+h\times N\right),$$

where K is the camera parameter matrix, N is the ground normal, D is the constant term of the ground equation, and $L_{cos}$ is the cosine distance; $\lambda_{angle}$ and $\lambda_{mod}$ are the weights of the corresponding loss items; $p_s$ and $p_a$ are the center of the shoulders and the center of the ankles; $p'_s$ is the predicted shoulder center point estimated by using the camera parameters and the ground equation; $\|\cdot\|_2$ is the second norm; $z_a$ is the depth of the center point of the ankle; $z'_s$ is the depth of the center of the shoulder; h is the height of the person.

4. The method for dynamic 3D crowd reconstruction from a large-scene video according to claim 3, characterized in that the specific implementation process of S3 is as follows:

S301: Estimate the initial parameter model (SMPL model) and 3D Human-scene Virtual Interaction Point (3DHVIP) in the local coordinate system based on the image blocks and bounding boxes, masks, 2D keypoints of all individuals;

S302: Extract features of poses (SMPL model), position (2D keypoints, 3DHVIP), and appearance (Mask) for each individual, forming frame-wise representation, based on previous frames representation, predict the current-frame representation of individuals and match this representation with the detections of other individuals in the current frame to update the trajectory, thereby achieving continuous tracking of individuals;

S303: Use the human motion trajectory information and the detected 2D keypoints to preliminarily optimize poses of the SMPL model.

5. The method for dynamic 3D crowd reconstruction from a large-scene video according to claim 4, characterized in that the specific implementation process of S4 is as follows:

S401: Use a pose prior optimizer for root optimization, adjusting the rotation and translation matrices of the root node in the preliminarily optimized SMPL model;

S402: Use the pose prior optimizer again for SMPL optimization to adjust the root node's rotation matrix, translation matrix, pose, and shape.

6. The method for dynamic 3D crowd reconstruction from a large-scene video according to claim 5, characterized in that S5 introduces a human motion prior model trained through a variational autoencoder using an encoder-decoder structure; during optimization, latent variable encoding is extracted from the motion and used as an optimization variable, which is subsequently decoded to obtain the optimized SMPL model.

7. The method for dynamic 3D crowd reconstruction from a large-scene video according to claim 6, characterized in that the specific implementation process of S6 is as follows:

S601: Design a new crowd grouping paradigm by dividing the crowd's motion sequences in the global space into several segments; then, cluster these motion sequences and divide the crowd in the large-scene video into smaller groups with similar motion patterns;

S602: Calculate the unocclusion score of each individual's motion based on the 2D keypoint detection confidence and joint importance; adaptively select the occluded sequence to be repaired and the corresponding unoccluded sequence, along with the optimization weights for the unoccluded sequence;

S603: Introduce an asynchronous motion consistency loss for joint optimization, guiding the reconstruction of occluded sequences through unoccluded sequences:

$$E_{AMC} = \frac{1}{N_{updated}} \sum_{g \in G} \sum_{i \in S_g} w_i \cdot \text{Soft} - DTW(x_i, r_g),$$

where G is the set of all groups, $S_g$ is the set of people (indices) in group $g \cdot w_i$ is the weight for person i in group $g \cdot x_i$ is the sequence of body poses for person $i \cdot r_g$ is the reference sequence for group g: If there is a "best" person identified in the group (with index b), $r_g = x_b$, If no best person is identified, $r_g$ is a fixed template sequence, Soft-DTW($x_i$, $r_g$) is the soft dynamic time warping loss between sequences $x_i$ and $r_g \cdot N_{updated}$ is the total number of people across all groups with a weight $w_i > 0$ (i.e., the number of people being updated).

* * * * *